(12) United States Patent
Sharma et al.

(10) Patent No.: US 10,628,253 B2
(45) Date of Patent: Apr. 21, 2020

(54) SYSTEMS AND METHODS FOR COGNITIVE CONTROL OF DATA ACQUISITION FOR EFFICIENT FAULT DIAGNOSIS

(71) Applicant: TATA CONSULTANCY SERVICES LIMITED, Mumbai (IN)

(72) Inventors: Hrishikesh Sharma, Bengaluru (IN); Hiranmay Ghosh, Bengaluru (IN); Balamuralidhar Purushothaman, Bengaluru (IN)

(73) Assignee: Tata Consultancy Services Limited, Mumbai (IN)

( * ) Notice: Subject to any disclaimer, the term of this patent is extended or adjusted under 35 U.S.C. 154(b) by 221 days.

(21) Appl. No.: 15/980,188

(22) Filed: May 15, 2018

(65) Prior Publication Data

US 2018/0341535 A1 Nov. 29, 2018

(30) Foreign Application Priority Data

May 24, 2017 (IN) .............................. 201721018235

(51) Int. Cl.
*G06K 9/00* (2006.01)
*G06F 11/00* (2006.01)
(Continued)

(52) U.S. Cl.
CPC ........ *G06F 11/079* (2013.01); *G05B 23/0208* (2013.01); *G06F 11/0721* (2013.01);
(Continued)

(58) Field of Classification Search
CPC . G06K 9/00637; G06K 9/0063; G06F 11/079
See application file for complete search history.

(56) References Cited

U.S. PATENT DOCUMENTS 6,415,276 B1 * 7/2002 Heger ...................... G05B 9/02
702/183
7,206,771 B2 4/2007 Alvarez et al.
(Continued)

OTHER PUBLICATIONS

Author: Chris Hobbs Title: Fault Tree Analysis with Bayesian Belief Networks for Safety-Critical Software Date: 2009 p. 10 Publisher: QNX Software Systems Link: http://www.qnx.com/content/dam/qnx/whitepapers/2010/qnx_bayesian_tree_RIM_MC411.22.pdf

*Primary Examiner* — Jonathan D Gibson
(74) *Attorney, Agent, or Firm* — Finnegan, Henderson, Farabow, Garrett & Dunner LLP

(57) ABSTRACT

Remote sensing techniques are being increasingly used for periodic structural health monitoring of vast infrastructures. Conventionally, analysis of visual and other signals captured from sensing devices are used to diagnose faults. Such data collection and analysis is expensive in terms of both computational overheads as well as towards robotic maneuvering of data collection systems, such as a UAV. In accordance with the present disclosure, the data acquisition system is modeled as an intelligent situated agent that autonomously controls data gathering and analysis activities through a cognitive cycle of perception-recognition-action, in order to optimize the cost of efforts in identifying faults that may exist. Also, a reactive, economical planning algorithm around Qualitative Bayesian Network (QBN) that controls the sequence of data collection and analysis has been implemented.

16 Claims, 7 Drawing Sheets

(51) Int. Cl.
  *G06F 11/07*  (2006.01)
  *G06N 7/00*   (2006.01)
  *G05B 23/02*  (2006.01)
  *G06N 3/00*   (2006.01)
  *G06N 5/02*   (2006.01)

(52) U.S. Cl.
  CPC ....... *G06K 9/0063* (2013.01); *G06K 9/00637* (2013.01); *G06N 3/006* (2013.01); *G06N 5/02* (2013.01); *G06N 5/022* (2013.01); *G06N 7/005* (2013.01)

(56) References Cited

U.S. PATENT DOCUMENTS

| | | | |
|---|---|---|---|
| 9,366,451 B2 | 6/2016 | Guo et al. | |
| 9,740,200 B2* | 8/2017 | Bethke | G05D 1/0094 |
| 9,823,658 B1* | 11/2017 | Loveland | G05D 1/0094 |
| 9,965,683 B2* | 5/2018 | Verdejo | G06K 9/00577 |
| 10,001,518 B2* | 6/2018 | Cheim | G05B 23/024 |
| 10,127,453 B2* | 11/2018 | Verdejo | G06K 9/00577 |
| 10,207,801 B2* | 2/2019 | Garcia-Gabin | G05D 1/0094 |
| 2005/0271250 A1* | 12/2005 | Vallone | G06K 9/00771 382/103 |
| 2008/0086283 A1* | 4/2008 | Yuan | G05B 23/024 702/181 |
| 2010/0215212 A1* | 8/2010 | Flakes, Jr. | G01M 5/0025 382/100 |
| 2016/0025850 A1* | 1/2016 | Rigsby | G01S 13/881 342/61 |
| 2017/0032509 A1* | 2/2017 | Mannar | G06T 7/73 |
| 2017/0349279 A1* | 12/2017 | Garcia-Gabin | G05D 1/0094 |

* cited by examiner

SYSTEMS AND METHODS FOR COGNITIVE CONTROL OF DATA ACQUISITION FOR EFFICIENT FAULT DIAGNOSIS

PRIORITY CLAIM

This U.S. patent application claims priority under 35 U.S.C. § 119 to: Indian Patent Application No. 201721018235, filed on 24 May, 2017. The entire contents of the aforementioned application are incorporated herein by reference.

TECHNICAL FIELD

The embodiments herein generally relate to fault diagnosis in infrastructural systems and more particularly to systems and methods for cognitive control of data acquisition for efficient fault diagnosis in infrastructural systems.

BACKGROUND

Infrastructural systems such as power transmission systems are often spread over large and hostile geographical terrain. There has been significant research in monitoring health of such infrastructure through remote sensing techniques to alleviate the cost and effort involved. One popular approach to remote monitoring is through automatic or human-assisted interpretation of optical images collected through Unmanned Aerial Vehicles (UAVs). UAV is generally preferred as a data acquisition platform for its advantages, such as (a) flexibility to make observations from close proximity as well as different perspectives, and (b) possibility of on-demand observation. The various vision-based remote monitoring techniques proposed so far attempt to identify individual faults and exceptions in the system. A typical remote monitoring system gathers several aerial images and attempts to analyze them to identify the potential faults. Identification of a fault generally requires an image from a specific viewpoint and desired resolution. Traditionally, UAVs are planned to operate along such a path that they not only capture images from required viewpoints, but also along interpolated path segments between these viewpoints. The limited battery-life of a UAV is known to be the primary cause limiting the range of its flight. Hence it is necessary to make optimal use of flight time for cost-effective monitoring. Blind, unplanned acquisition and processing of images, results in increased image acquisition and processing loads as well as wasteful UAV maneuvering.

SUMMARY

Embodiments of the present disclosure present technological improvements as solutions to one or more of the above-mentioned technical problems recognized by the inventors in conventional systems.

In an aspect, there is provided a processor implemented method comprising: encoding a static knowledge graph pertaining to (i) an infrastructure being monitored, (ii) ambience and (iii) a data acquisition system configured to monitor the infrastructure in the form of a Qualitative Believe Network (QBN); and iteratively performing inferencing of the QBN by: dynamically capturing observed state of one or more nodes constituting the QBN and propagating belief on an instance of the static knowledge graph; identifying list of nodes with unobserved evidences in the QBN; computing Quality of Observation (QoO) for each of the nodes in the list; selecting the node having a highest value of QoO; obtaining vision based observation of the node having the highest value of QoO; and assigning the vision based observation as current observed state to the node having the highest value of QoO; until a stopping criterion is reached.

In another aspect, there is provided a system comprising: one or more data storage devices operatively coupled to the one or more processors and configured to store instructions configured for execution by the one or more processors to: encode a static knowledge graph pertaining to (i) an infrastructure being monitored, (ii) ambience and (iii) a data acquisition system configured to monitor the infrastructure in the form of a Qualitative Believe Network (QBN); and iteratively perform inferencing of the QBN by: dynamically capturing observed state of one or more nodes constituting the QBN and propagating belief on an instance of the static knowledge graph; identifying list of nodes with unobserved evidences in the QBN; computing Quality of Observation (QoO) for each of the nodes in the list; selecting the node having a highest value of QoO; obtaining vision based observation of the node having the highest value of QoO; and assigning the vision based observation as current observed state to the node having the highest value of QoO; until a stopping criterion is reached.

In yet another aspect, there is provided a computer program product comprising a non-transitory computer readable medium having a computer readable program embodied therein, wherein the computer readable program, when executed on a computing device, causes the computing device to: encode a static knowledge graph pertaining to (i) an infrastructure being monitored, (ii) ambience and (iii) a data acquisition system configured to monitor the infrastructure in the form of a Qualitative Believe Network (QBN); and iteratively perform inferencing of the QBN by: dynamically capturing observed state of one or more nodes constituting the QBN and propagating belief on an instance of the static knowledge graph; identifying list of nodes with unobserved evidences in the QBN; computing Quality of Observation (QoO) for each of the nodes in the list; selecting the node having a highest value of QoO; obtaining vision based observation of the node having the highest value of QoO; and assigning the vision based observation as current observed state to the node having the highest value of QoO; until a stopping criterion is reached.

In an embodiment of the present disclosure, the one or more hardware processors are further configured to identify a plausible fault node based on the inferencing of the QBN.

In an embodiment of the present disclosure, the one or more hardware processors are further configured to resolve node ambiguities within sub-graphs of qualitative belief networks when capturing observed state of one or more nodes constituting the QBN and propagating belief.

In an embodiment of the present disclosure, the one or more hardware processors are further configured to resolve node ambiguities by assigning either a positive belief (+) state or a negative belief (−) state to one or more cause nodes having an ambiguous state (?) by: allowing an indirectly propagated influence to dominate a prior state of a cause node and behave as a direct influence, if the identified errant sub-graph leads to ambiguous inferences during indirect influence on the cause node; and blocking propagation of intercausal influence between two cause nodes, if an identified errant cyclic sub-graph leads to ambiguous inferences during mutual propagation of opposing influences therebetween.

In an embodiment of the present disclosure, the Quality of Observation (QoO) is based on parameters including: reach (r) of an observation being number of inference nodes likely to change state as a result of the observation; accuracy (a) of an observation being the accuracy of computer vision algorithms generating the observation; cost (c) of an observation being cost of sensors capturing the observation and cost of operating the data acquisition system; and boolean significance (S) of a node given the sign of prior observations ($O_{prior}$).

In an embodiment of the present disclosure, the stopping criterion is one of: a plausible fault node with an unambiguous belief of '+' or '−' is identified; all cause nodes do not update associated belief signs in a next iteration; or some of the cause nodes start getting associated with an ambiguous '?' belief state that does not get resolved.

It is to be understood that both the foregoing general description and the following detailed description are exemplary and explanatory only and are not restrictive of the embodiments of the present disclosure, as claimed.

BRIEF DESCRIPTION OF THE DRAWINGS

The embodiments herein will be better understood from the following detailed description with reference to the drawings, in which.

Figure 1:
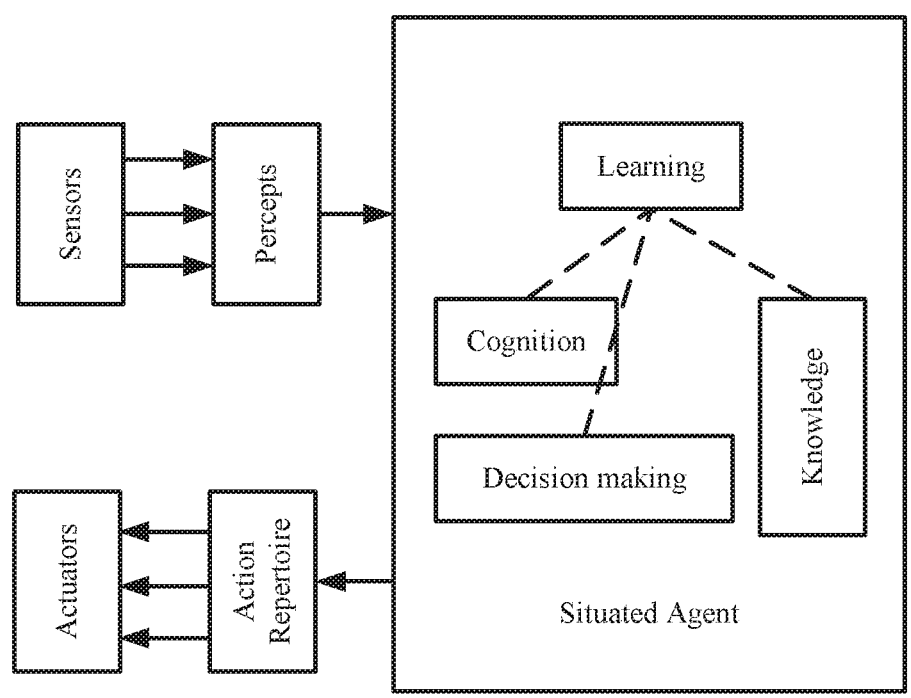
FIG. 1 illustrates an exemplary schematic representation of a cognitive loop of a situated agent, in accordance with the present disclosure.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Before setting forth the detailed explanation, it is noted that all of the discussion below, regardless of the particular implementation being described, is exemplary in nature, rather than limiting.

The expression "infrastructure" or "infrastructural systems" in the context of the present disclosure refers to physical components of interrelated systems that may be monitored for various purposes such as maintenance, security, performance analyses, and the like. Some examples of infrastructures include power transmission systems, water distribution systems, sewage networks and the like.

Systems and methods of the present disclosure present a cognitive approach to control sensor observations and for cost-effective monitoring of infrastructures. Rather than making observations in a predefined (static) order for all types of potential faults, the present disclosure presents a systematic approach where interpretation of one observation leads to planning for another. Further, the ambient knowledge (environmental information) leads to certain assumptions resulting in prioritizing of the observations. For example, while inspecting a power transmission system, observation of sagging wires lead to a necessity of further observations of cross-arms and the tower to ascertain its cause. The information about a local cyclone leads to the suspicion of tower bends or collapses, prioritizing those observations. Such cognitive skills results in optimal set of observations and reduction in monitoring efforts. Incorporating such cognitive cycle in automated power transmission system monitoring using Unmanned Aerial Vehicles (UAVs) results in reduction in efforts involved in complex computer vision algorithms that are executed on an on-board computer, and UAV maneuvering activities. Ultimately, these result in saving precious battery life. Moreover, identification of many such problems, such as rusting of the tower truss or discovering a missing bolt, are extremely difficult using (direct) computer vision techniques. Systems and methods of the present disclosure facilitate detecting such faults with a reasonable (unambiguous) confidence with a reasoning process described herein under.

The systems and methods of the present disclosure will now be explained with reference to fault diagnosis in power transmission systems. It may be noted that power transmission system is only used as an exemplary infrastructure and the described systems and methods may be applied to any other infrastructure. Data gathering platform or data acquisition system in the context of the present disclosure may be a UAV, as an intelligent agent, situated or otherwise, that is capable of autonomous decision making with respect to successive observations to be performed in order to find faults and their nature. Such decision-making is facilitated by knowledge-based reasoning with observations and reactive planning. Background knowledge captures uncertain causal relations that exist across the power transmission system and their potential faults. Crisp logic cannot be used for reasoning with uncertainty. The present disclosure employs a qualitative reasoning technique, particularly, a Qualitative Belief Network (QBN) to represent the background knowledge and to reason with it. It may be noted that though a quantitative probabilistic framework (e.g. Bayesian Belief Networks, BBN) can provide more accurate and less ambiguous results, qualitative reasoning is employed in the present disclosure to leverage the advantage of faster computations, suitable for on-board computations on a UAV. Another reason of preference for QBN over BBN is that the former can be constructed with experts' beliefs on qualitative influences across nodes without requiring quantitative prior probability values. While qualitative influences are known with fair degree of confidence, quantitative probabilities are hard to obtain for the entities in power transmission system monitoring problems. While QBN offers several practical advantages, a serious concern is that the reasoning often leads a node to an ambiguous state, when inferencing fails. The Applicant has addressed this concern in Indian patent application no. 201721018000 for particularly two types of errant sub-graph configurations that may be identified with the QBN. Further, an algorithm for reactive, economical planning for deciding the next observation in the observation sequence has been implemented in the present disclosure. The planning is based on the current state of the QBN that is used for reasoning with observations on the infrastructure being monitored. The observations pertain to fault symptoms. The planning algorithm of the present disclosure successively narrows down to ascertain one or more potential faults (as less as possible), till a point of reasonable confidence.

Referring now to the drawings, and more particularly to FIGS. 1 through 6, where similar reference characters denote corresponding features consistently throughout the figures, there are shown preferred embodiments and these embodiments are described in the context of the following exemplary system and method. FIG. 1 illustrates an exemplary schematic representation of a cognitive loop of a situated agent, in accordance with the present disclosure. A set of sensors gathers input data from the environment, which is transformed to percepts through some processing stages. The percepts are interpreted, resulting in cognition about the state of the system (the agent and the environment). The cognition leads to some decision-making, which results in selection of an appropriate set of actions that is expected to change the state of the system to further the goals of the agent to the greatest possible extent. The cognition and decision-making process is assisted by background knowledge about the system, and is generally accompanied with a learning module that updates the knowledge-base from the experience gathered by the agent during its course of operation.

Figure 2:
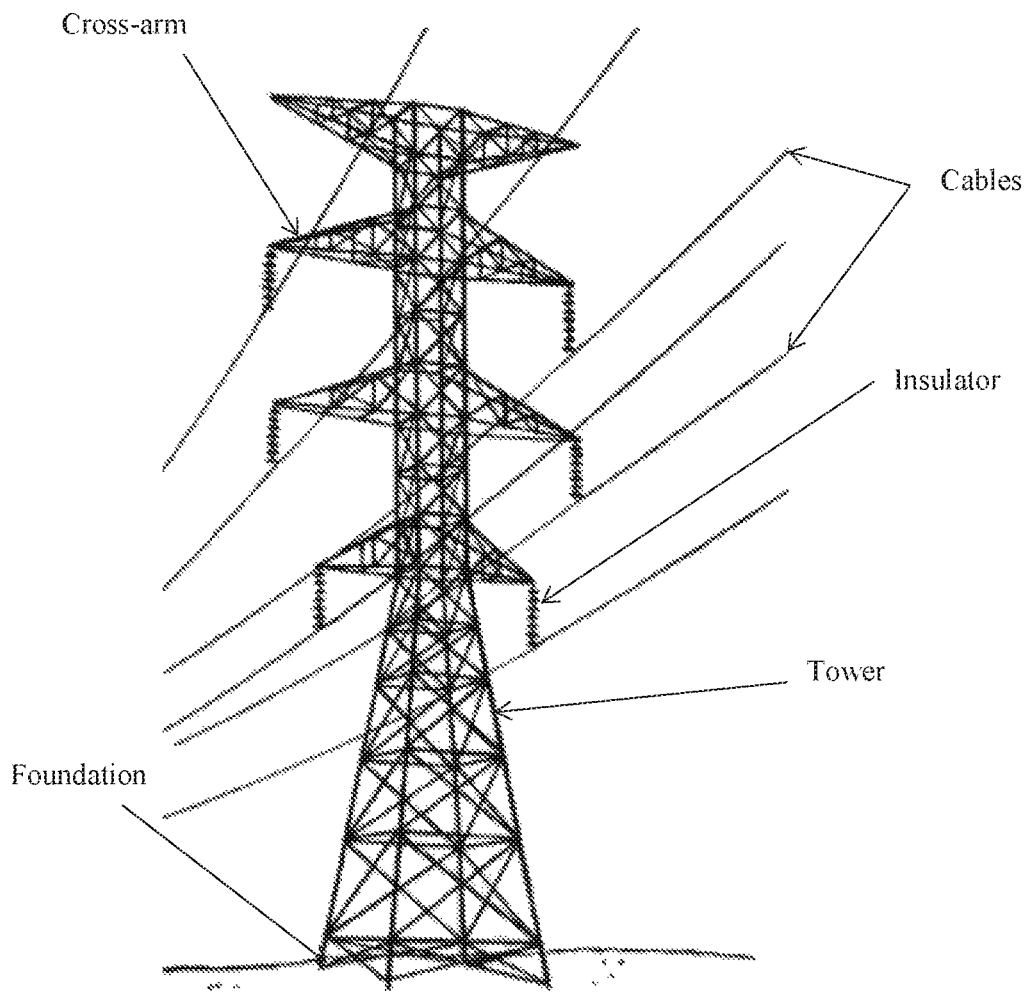
FIG. 2 illustrates a general power transmission system, as known in the art.

FIG. 2 illustrates a general power transmission system, as known in the art, comprising a tower, cables, insulators, cross-arms and foundation. In an exemplary power transmission system (e.g. FIG. 2) being monitored, a UAV assumes the role of a situated agent. The expressions 'agent', 'situated agent', 'data acquisition system', 'data collection platform' and 'UAV' may be used interchangeably hereinafter. The goal of the agent is to discover the faults in the power transmission system being monitored, if any, with least possible ambiguity and with least possible efforts. The UAV may be equipped with visual sensors. The inputs collected through the visual sensors may be interpreted with computer vision techniques to determine states of the different components or subsystems of the power transmission system. For example, a significant deviation of the axis of a pylon from the vertical can be interpreted as a leaning tower, and so on. The percepts, in general, indicate states of the components, which are either faults in themselves or symptoms to potential faults. An example of the latter is discovery of water-logging or encroachment at the foot of the tower, which may result in damage to the tower. Other types of sensors, such as infrared sensors, acoustic sensors, etc. may also be adopted along with appropriate signal processing techniques. Acquisition of certain imagery from a robotic data collection platform (e.g. an UAV) may require complex maneuver of the data collection platform, based on sensor range and required accuracy of data. Further, certain image processing tasks are more challenging to the computer vision techniques on the on-board computer. For example, to observe the ground clearance of the cables, a UAV has to dive down so that the cables are seen above the horizon. Similarly, ascertaining the angle of a tower or the cross-arms is more expensive than locating water-logging or encroachment on the base of the tower. This motivates the need for planning the observations, so that the potential faults can be discovered with least ambiguity as well as least operational cost.

The core of the agent consists of a knowledge-base that captures the knowledge about the transmission system components, its possible faults and the causal relations that interconnect them. The knowledge is encoded as a QBN and qualitative reasoning is used over it. An observation leads to certain beliefs about the states of some of the system components, which flows through the belief network to indicate possible faults, leading to some belief in the state of the transmission system. At any given stage of computation, there may be some ambiguity with the beliefs regarding the states of the system. Further observations may eliminate some of the possibilities and strengthen some others, thus refining the belief values and potentially alleviating the ambiguity. The agent is also assumed to possess knowledge about its own capabilities that helps in estimating effort required for an observation, in terms of maneuvering the agent and image processing, at any stage. Knowledge about the transmission system, environment and the agent itself is used for decision-making, in terms of planning the further observations to be undertaken. This is essentially a problem of reactive planning with a trade-off between maximal reduction in ambiguity and minimal cost of operation. Once the next observation is decided, the actions required (agent maneuver and image processing tasks) are picked up from the action repertoire and are effected through the sensors in a desired sequence.

Figure 3:
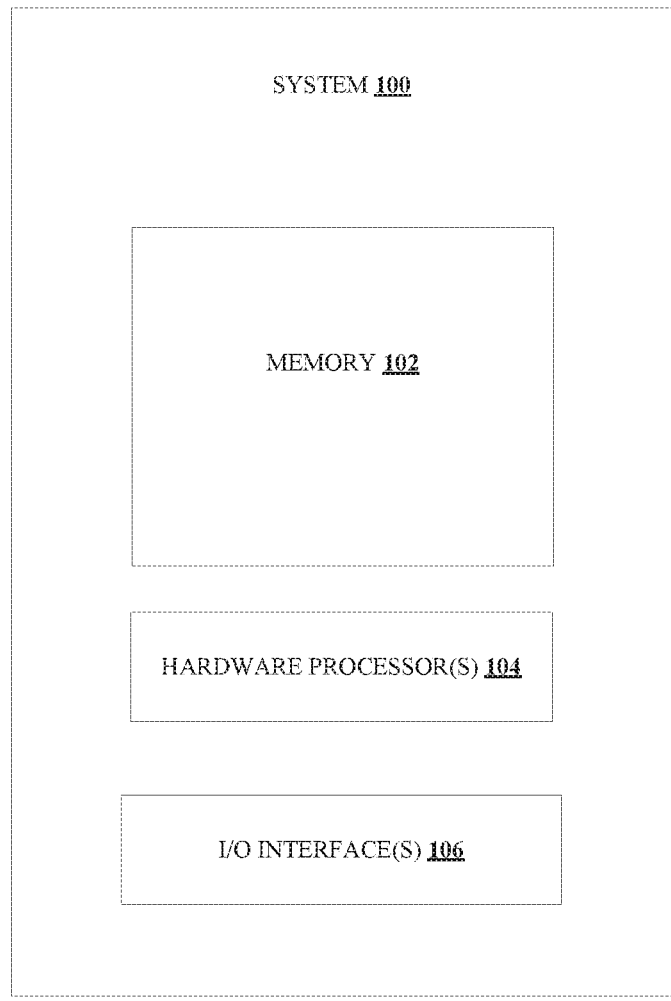
FIG. 3 illustrates an exemplary block diagram of a system for cognitive control of data acquisition for efficient fault diagnosis, in accordance with an embodiment of the present disclosure.

FIG. 3 illustrates an exemplary block diagram of a system 100 for cognitive control of data acquisition for efficient fault diagnosis, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 4A:
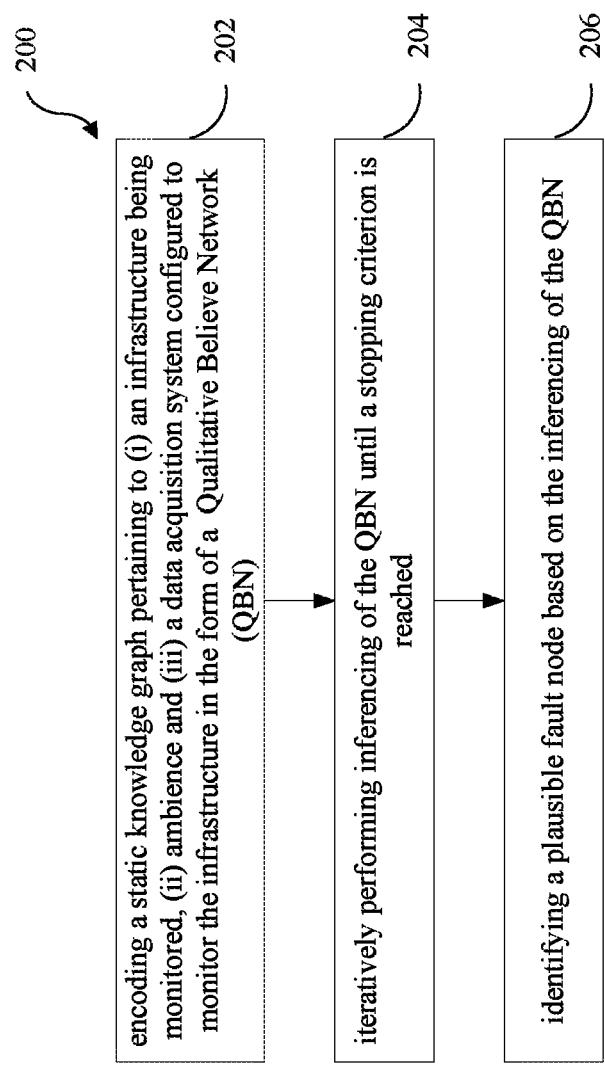
FIG. 4A through FIG. 4B is an exemplary flow diagram illustrating a computer implemented method for cognitive control of data acquisition for efficient fault diagnosis, in accordance with an embodiment of the present disclosure.
Figure 4B:
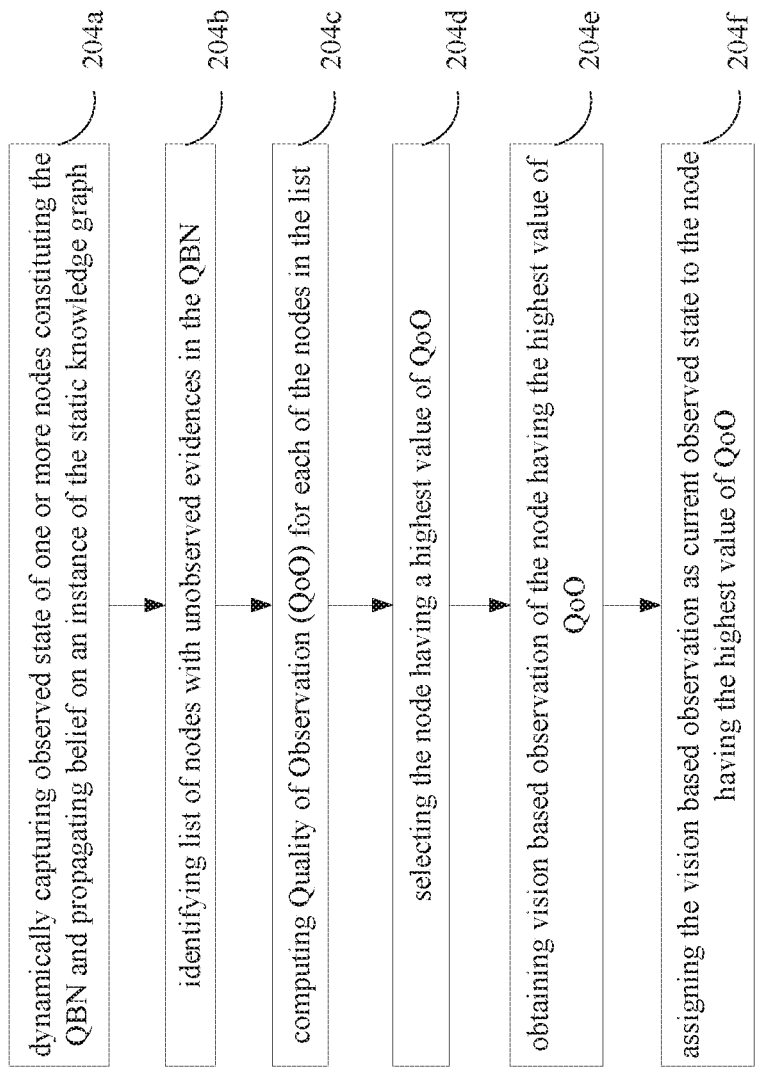

FIG. 4A through FIG. 4B is an exemplary flow diagram illustrating a computer implemented method 200 for cognitive control of data acquisition for efficient fault diagnosis, in accordance with an embodiment of the present disclosure. In an embodiment, the system 100 comprises one or more data storage devices or memory 102 operatively coupled to the one or more processors 104 and is configured to store instructions configured for execution of steps of the method 200 by the one or more processors 104.

Figure 5:
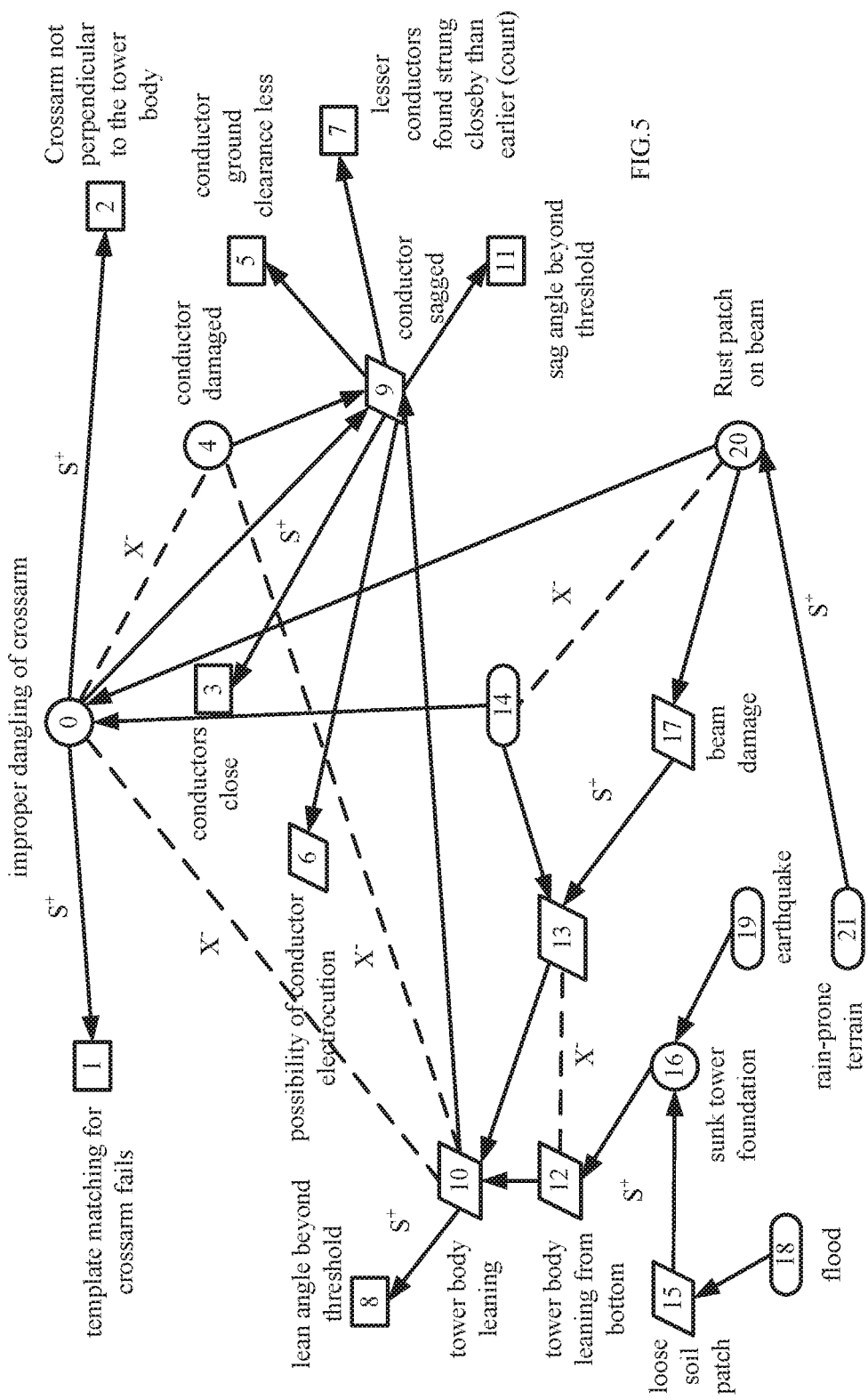
FIG. 5 illustrates an exemplary knowledge graph of a power transmission system, in accordance with the present disclosure.

The steps of the method 200 will now be explained in detail with reference to the components of the system 100. In accordance with the present disclosure, the one or more processors 104 are configured to encode, at step 202, a static knowledge graph pertaining to (i) an infrastructure being monitored, (ii) ambience and (iii) a data acquisition system configured to monitor the infrastructure in the form of a Qualitative Believe Network (QBN). FIG. 5 illustrates an exemplary knowledge graph, in accordance with an embodiment of the present disclosure, of a power transmission system generally depicted in FIG. 2. Each node in the knowledge graph represents one of the following entities: (a) a possible fault in the system, e.g. "Tower Leaning", represented by circular nodes, (b) a possible observation i.e. a fault symptom, e.g. "conductor ground clearance less", represented by square nodes, (c) an intermediate node to reason about faults that are not directly observable from a given set of observations, represented by rhombus shaped nodes or (d) ambient condition, e.g. "Earthquake", "Cyclone", etc. that may cause a fault in the system, represented by oval shaped nodes. The directed edges between the nodes model the cause-effect relations between the nodes. For example, "Cyclone" causes "Dangling Crossarms", etc. In QBN terminology, it means that the nodes connected with such causal links influence each other. Some of the faults may link to further faults; e.g. "Conductor Sagged" could also imply "Sunk Foundation". Belief may flow in either direction, implying either causal or evidential reasoning. The visual manifestations of faults have been modeled as to have been caused by the faults, e.g. the fault "Conductor Sagged" manifests into "Less number of conductors". The causal modeling of manifestation of faults (conceptual entities) is motivated by Multimedia Web Ontology Language (MOWL). Not all of the faults have observable (from remote sensing perspective) manifestations, e.g. a patch of rust on the tower body, or damaged conductor. Even if image processing techniques are available to detect such faults, they are extremely difficult and error-prone, for instance, "conductor damaged" or "rust patch on beam". They can be detected using inferencing with indirect observations, as we shall show in a later section. It may be noted that the causal relations are marked with uncertainty; e.g., "cyclone" does not guarantee "Dangling Crossarms", it is rather a possibility. The present disclosure exploits such uncertain relations and locates the fault(s) with reasonable confidence based on the evidences produced though observational and ambient knowledge.

Figure 6:
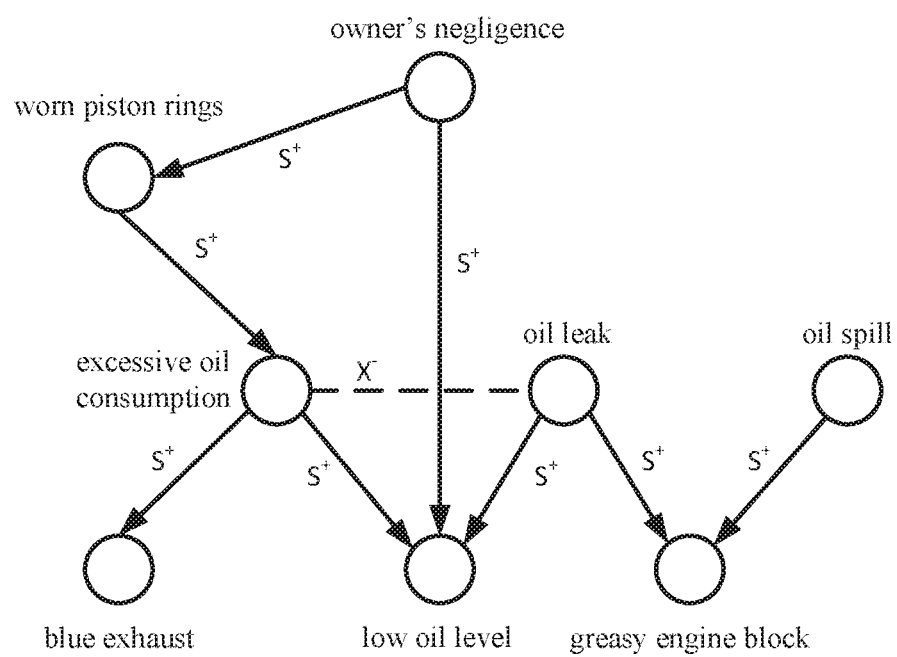
FIG. 6 illustrates an exemplary Qualitative Belief Network (QBN) that captures interaction of various variables related to low level of car engine oil, as known in the art.

FIG. 6 illustrates an exemplary Qualitative Belief Network (QBN) that captures interaction of various variables related to low level of car engine oil. All variables in the exemplary QBN are propositional. Owner's negligence in replenishing oil leads to low oil level and in the long run to worn piston rings and excessive oil consumption. Low oil level can be also caused by an oil leak (e.g. through a cracked gasket). Oil leak and possible oil spills during adding or replacing oil can give the engine block a greasy look. Some of the variables in the QBN are directly observable; the others may be inferred. In a QBN, a node can assume discrete belief values, namely '+', '−', '0' and '?'. Belief values '+' and '−' represent positive and negative beliefs respectively, in a corresponding proposition. For example, a '+' for "oil leak" implies that some visual observation positively corroborates this proposition, directly or indirectly. The value '0' indicates that no information is (yet) available about the node. The value '?' indicates that contradictory information has been obtained for that node and therefore, its value cannot be ascertained. Edges between nodes in a QBN may be associated with positive or negative influences and may be labeled with S+ and S− respectively. Generally, a positive (negative) influence between two nodes A and B signifies that a positive belief in A induces a positive (negative) belief in B and vice-versa. Similarly, a negative influence between the nodes signifies that a positive belief in A induces a negative belief in B and vice-versa. A positive or negative product synergy exists between two nodes A and B, if they have a common descendant C, and observation of C or any of its descendants, followed by observation of one of A and B leads to increase or decrease in belief of the other node. In such cases, the nodes A and B are connected with an edge labeled $X^+$ or $X^-$, depending on increase or decrease of belief. For example, "Excessive oil consumption" and "oil leak" do not cooperate but compete each other, to explain the effect of positive, prior to direct or indirect observation at "low oil level" node. Hence the edge between them is annotated with $X^-$.

Reasoning in QBNs entails establishing the most probable cause, or set of causes, for an effect, given a set of evidences produced by various observations of effects related to propositions that the individual evidence nodes encapsulate within. The fastest and most popular way for that is by doing sign-propagation. Sign propagation involves first assigning a sign to an effect node, given the hard evidence produced/input towards the corresponding proposition. Then the sign is recursively propagated to all active neighbors of each of those nodes, which had their signs updated during the previous recursion, thereby getting their assignments of soft evidences. The propagation over links representing synergies happens in a special way. The propagation along the synergy edges does not take place till the common descendant node has been observed in a previous iteration. Belief flow down an X− link is often referred to as "explain away". As a simple example, an observed "low oil level" can have been caused by either "Excessive oil consumption" or "oil leak", and we may have equal belief in the two competing causes. Subsequent observation of "oil leak" to have occurred explains away i.e. reduces the belief of, "excessive oil consumption".

The knowledge graph of FIG. 5 is static; it encodes knowledge about the causal dependencies between the various nodes, without any belief assigned to their states. For inferencing, an instance of the static knowledge is created and belief values for all nodes are initialized to '0'. Further belief propagation is done on this instance, which dynamically captures the state of a node under observation. As known, a node in a QBN may change its state at most twice, first from '0' to one of {+, −, ?}, and then from {+, −} to '?'. Further, a node, whose value does not change during belief propagation effectively blocks belief flow further down the graph. These, together with simpler algebraic computations, are the keys to faster reasoning with QBN in comparison with BBN. However, the state '?' representing ambiguity is a bane for reasoning. Once a node goes to that state, it can never come out of it and assume '+' or '−' values, and any inference on the node cannot be drawn. Further, the '?' state blocks belief propagation path in the network. Ambiguity may be resolved using different methods known in the art, such as use of dominance in cases of contradictory belief propagation along multiple paths connecting two nodes.

The Applicant has in the Indian patent application no. 201721018000 disclosed identification of two errant sub-graphs configurations that may occur within a QBN such as a sub-graph wherein two cause nodes have an observation node in the form of a common descendant and another observation node provides an indirect influence on one of the two cause nodes; and a cyclic sub-graph wherein there are at least three active negative product synergy edges and at least one of the nodes associated thereof is common to two of the negative product synergy edges. The Applicant, in the Indian patent application no. 201721018000 has disclosed resolving ambiguities in these two errant sub-graph configurations by assigning either a positive belief (+) state or a negative belief (−) state to one or more cause nodes be led to the ambiguous state (?). Particularly, if the sub-graph involving the indirect influence leads one of the two cause nodes to the ambiguous state (?) and thereby to ambiguous inferences, the indirect influence on one of the two cause nodes may be allowed to dominate a prior state associated thereof and behave as a direct influence. Again, if the cyclic sub-graph involving at least three active negative product synergy edges leads the two cause nodes to the ambiguous state (?) and thereby to ambiguous inferences during mutual propagation of opposing influences therebetween, propagation of intercausal influence between two cause nodes may be blocked.

In accordance with the present disclosure, the one or more processors 104 are configured to iteratively perform inferencing of the QBN that encodes the knowledge graph of FIG. 5, at step 204, until a stopping criterion is reached. The inferencing involves dynamically capturing observed state of one or more nodes constituting the QBN and propagating belief on an instance of the static knowledge graph, at step 204a; identifying list of nodes with unobserved evidences in the QBN at step 204b; computing Quality of Observation (QoO) for each of the nodes in the list at step 204c; selecting the node having a highest value of QoO at step 204d; obtaining vision based observation of the node having the highest value of QoO at 204e; and assigning the vision based observation as current observed state to the node having the highest value of QoO at step 204f. The pseudo code for the greedy algorithm that provides an optimal solution for efficient observation planning may be presented as below:
while Stopping Criterion is not met do
    Make a list of yet-unobserved evidences in the QBN
    Calculate Q(G) for each item in the list
    Choose the item with highest value of Q(G)
    Make vision-based observation for such item/proposition
    Use this observation as current evidence in next cycle
end while In accordance with the present disclosure, QoO defines a quality metric that may be used to decide action or the next observation for the agent. In accordance with an embodiment, the QoO is based on parameters listed herein below.
(i) reach (r) of an observation is the number of inference nodes likely to change state as a result of the observation. The current state of the QBN influences the reach since the already observed nodes and the current belief values define the blocking of various trails that cut off reach to the nodes beyond a blocking set. Thus the reach of an observed node depends not only on current state, but also on the sign of the current observation. For small networks, it is possible to compute the exact value of reach for each of the remaining non-observed nodes, in short time. Else, in accordance with the present disclosure, at all times, the reach is upper-bounded by the difference of total number of nodes, and the number of nodes which are blocked by the prior observed nodes, on the minimal evidential trail from the current observed node.
(ii) accuracy (a) of an observation is the accuracy of computer vision algorithms generating the observation. There can be various measures of accuracy. In an embodiment, estimated F-score of retrieval maybe used.
(iii) cost (c) of an observation is the cost of sensors capturing the observation and cost of operating the data acquisition system. More specifically, it is the sum of the cost of maneuvering the data acquisition system (e.g. UAV), and the cost of the computer vision technique used for the observation. Kalman tracking or other such methods known in the art may be employed for computing the cost. The overall cost is the algebraic upper bound i.e. the maximum of the vision-based maneuvering and vision-based detection complexities that represent the corresponding costs. This is because addition of two complexity figures is dominated (and hence max( ) operation) by the higher complexity figure. To convert the algebraic (overall) cost model into an arithmetic figure, so that the final figure for QoO be calculated, a unit size of image is assumed to be 600×480 pixels, which may be the lowest resolution of cameras available in market. The aerial datasets that were collected for the present disclosure, and used in vision algorithms have the size of 3000×2250 pixels. Hence, the relative size of the image, N, required by the cost model is $$\frac{300 \times 2250}{600 \times 480} = 23.4$$

(iv) boolean significance (S) of a node given the sign of prior observations ($O_{prior}$) is defined, in an embodiment as given below.

$$S(G, O_{prior}) = \begin{cases} 1 \text{ if (current node } G \text{ and prior observed nodes compete to} \\ \quad \text{explain in a cyclic sub-graph)} \wedge \\ \quad \text{(there are still} > 1 \text{ unobserved nodes in the sub-graph} \\ \quad \text{which participate in some product synergy)} \wedge \\ \quad \text{(the current observed node has positive sign)} \\ 1 \text{ if (current node is a descendant of some cause node in a} \\ \quad \text{product synergy in which there are} > 1 \\ \quad \text{unobserved cause ndoes)} \wedge \\ \quad \text{(the current observed node has positive sign)} \\ 0 \text{ otherwise} \end{cases}$$

In accordance with the present disclosure, the Quality of Observation (QoO) for a node G, at any given state of the network, may be defined as:

$$Q(G) = \left[\frac{r(G) * a}{c}\right] \cdot S(G, O_{prior})$$

The intuition behind pursuing a positive sign is that the method tries to narrow down to a fault node with positive sign when there are at least two unobserved competing causes left. Since the two unobserved nodes participate in negative product synergies, if a '+' sign were to be inferred for one of the nodes, some of the causes get explained away in the current cycle. Hence unnecessary cost on observing redundant, remaining competing causes may be averted. In some sense, this function introduces a partition of the knowledge graph, such that only a smaller subgraph remains significant after each cycle.

In accordance with an embodiment of the present disclosure, the stopping criterion may be one of a plausible fault node with an unambiguous belief of '+' or '−' is identified; all cause nodes do not update associated belief signs in a next iteration; or some of the cause nodes start getting associated with an ambiguous '?' belief state that does not get resolved.

In accordance with an embodiment of the present disclosure, the one or more processors 104 are further configured to identify, at step 206, a plausible fault node based on the inferencing of the QBN. The methods of the present disclosure were validated on several scenarios.

Analysis of a first exemplary fault scenario: For the planning, the agent produced following component values, towards computation of QoO metric for one fault scenario, as shown in Table 1 below. For simplicity, computation related to the node with highest QoO metric only is shown in each row, per observation cycle (1st, 2nd, . . . ). In each cycle, the method of the present disclosure calculates QoO value for other nodes as well, but discards all nodes except for the one with highest value. The individual computations of parameters were carried out as per the details provided herein above. The value of N was fixed to 23.4, as computed herein above.

4, 12 and 20). Hence the method of the present disclosure suggests another observation to be made in next cycle, to disambiguate. In the second cycle, the method re-computes the QoO metric, based on new state of QBN, and suggests observation at node 8. Assume that observing node 8 leads to a negative ('−') belief in "Lean Angle beyond Threshold". Even after this observation and its propagation to all unblocked nodes (i.e. excluding node 11), it can be observed that fault nodes 0, 4 and 20 still have a positive ('+') belief retained in them. Hence the method once again suggests observation of node 2 in the third cycle, to disambiguate further. Assume that observing node 2 leads to a negative ('−') belief in "Crossarm improperly aligned". This time round, though, after propagation to all unblocked nodes (i.e. excluding nodes 11 and 8), only fault node 4 retains its positive belief. Thus this propagation clearly helps with narrowing down to a potential fault with reasonable confidence. The algorithm meets its first stopping criterion, due to narrowing down to one plausible cause, and stops suggesting further observations in further cycles. The overall order of observing various nodes, and inferences, follows human intuition. Based on the knowledge graph illustrated in FIG. 5, it may be noted that in terms of ease of direct observability, an inspector would typically observe "leaning tower", "dangling crossarm" and "damaged conductor", in that particular order. The negation of belief in first two fault nodes automatically reinforces his belief in "conductor damaged" as the fault node, which is now ascertained as the cause of the observed improper sag angle (fault symptom).

Analysis of a second exemplary fault scenario: As another fault scenario, in accordance with the present disclosure, let a (first) observation related to improper sag angle be positive, leading to belief in "sagged cable". The next observation would be about "tower (main body) leaning". By evidence of lean angle, suppose that this time round, this symptom is found to be true. This alters the further sequence of observation, as the significance function for other competing fault nodes will evaluate to 0 in subsequent cycles. This leads to pursual of leaning effect (fault symptom), to establish a cause (fault). It is straightforward to compute and see that the method of the present disclosure reactively suggests observation of node "rain-prone terrain", in next

TABLE 1

Quality of Observation metric for various evidences

| Cycle ID | Node ID with highest QoO | Node Proposition | Reach (r) | Accuracy (a) | Maneuver cost (m) | Detection cost (x) | Overall cost (c) | Observation quality |
|---|---|---|---|---|---|---|---|---|
| 1st | 11 | Sag Angle > Threshold | 22 | 85% | O(N) | O(N) | O(N) | 0.801 |
| 2nd | 8 | Excess Lean Angle | 20 | 76% | O(N) | O(N) | O(N) | 0.652 |
| 3rd | 2 | Misaligned Crossarm axis | 21 | 72% | O(N) | O(N) | O(N) | 0.648 |

The output of the method of the present disclosure suggests that node 11 may be observed first corresponding to sag angle beyond threshold. It maybe assumed that carrying out such vision-based observation does lead a positive ('+') belief in "conductor sagged". This belief then iteratively propagates to all nodes of the QBN, within the same observation cycle. It can be observed that all the nodes get a sign of '+' on propagation, including all the fault nodes (0, cycle. In that cycle, the fault node "Rust formation on beams" gets a positive ('+') sign (while all other competing causes get a '−' sign), and hence the iterative inferencing stops. Once again the method of the present disclosure may be noted following human intuition of the inspector. From the perspective of a human inspector, based on ease of direct observation, the inspector would typically observe "tower leaning", "rain-prone terrain", "rust formation", in that order. If both the first two observations are positive, then the last in sequence, the "rust formation" fault node is automatically deduced.

It may be noted that it is extremely difficult and costly to observe and visually identify a damaged (thin) conductor (first fault scenario) or rust formation on (thin) beams (second fault scenario), directly and automatically from UAV imagery. It requires getting quite close to the said components, which is not merely costlier in terms of maneuver cost, but also legally prohibited for power transmission systems. Inferring them from a distance beyond the mandatory "right of way" distance results in extremely poor detection accuracy, which leads to very small values of QoO metric for them. In both the scenarios, the method of the present disclosure circumnavigates the problem by inferring such fault with reasonable belief through contextual reasoning over optimally planned observations. Reasonable belief implies a limit of strong suspicion. Hence a human-in-loop operation is possible to make final conclusion about contextually inferred faults that are too difficult to detect through computer vision techniques. Diagnosis of such narrowed-down latent faults, "Conductor Damaged" or "Rust formation on beams", unambiguously with a '+' sign, are a byproduct of the observation planning of the present disclosure. However, as expected, unless ambiguity resolution as discussed above is used, competing causes e.g. "leaning tower", "dangling cross-arm" in the first fault scenario may not wean away. This is because the corresponding nodes only receive indirect influence from other observable nodes. In presence of an errant subgraph configuration discussed, it is straightforward to see that traditional belief propagation indeed results in ambiguous signs for competing causes. Similar argument holds for second fault scenario as well.

It may be noted that the method of the present disclosure stops after $3^{rd}$ cycle in both the exemplary fault scenarios described above. In both the scenarios, it is easily seen that for a next cycle and beyond, any further presentation of evidence on any observable node either leads to no change in sign configuration of all nodes (harmonious evidences), or leads to increase in number of ambiguous nodes (conflicting evidences). Thus at the 3rd cycle, the method of the present disclosure meets a stopping criterion. In doing so, it also happens to follow and generate the human-intuitive order for fault diagnosis.

It may also be observed that the solution has been economized over other possible pre-defined observation sequences in both fault scenarios, both in terms of sequence length and the cumulative cost of observations, to explain for a fault in wake of competing causes. This is because for example, in the first fault scenario, the knowledge graph of FIG. 5 establishes as ground truth that three different fault nodes have to be disambiguated, when node 11 is observed as a symptom for fault node 9. As a counter-example for the same fault scenario, another option could have been to randomly, manually plan and get observable ambient evidences first, rather than observing the (highest quality) "lean angle" symptom, e.g. recent instance of flood, cyclone etc. In that case, additional belief propagation and resolution among competing/negative product synergy causes (e.g. nodes 12 and 13) would increase the length of observation sequence. Further, since QoO metric is always positive, the cumulative cost would have been much higher, given additional observations. Thus the method of the present disclosure provides a desired optimal planning output. Similar counterexamples may also be seen for the second fault scenario. Thus economic sequence of observations may result in saving of battery life of the agent (UAV) in both scenarios. It is also imperative that such possibly minimal observation sequence also leads to reduced mission length and time, and lesser maneuvers required from the agent (UAV) platform.

It may further be noted from the signs of remaining nodes when the method of the present disclosure meets its stopping criterion that in the first fault scenario, even node "possibility of electrocution" has got a '+'. Similarly, in second fault scenario, the belief in "Sunk Tower Foundation" has reduced (the node gets a sign of '−'). Such observation, though not a fault, may need to be reported, to assign e.g. a severity level of the fault manifestation in the first scenario. There may not be a need to additionally plan and spend efforts to establish them. Ability to additionally infer about seemingly unrelated potential faults unambiguously, is another benefit of the planning algorithm of the present disclosure.

Thus in accordance with the present disclosure, systems and methods described herein above derive motivation from systematic fault diagnosis approach adopted by humans, who interpret one observation in the current context, and use that to plan out next observation to narrow down to a fault. The theory of Qualitative Belief Networks is used to design a cognitive cycle for observation planning. For the decision-making stage, within the cognitive cycle, a greedy algorithm that works with Bayesian Belief Network is used to make the choice of next observation, leading to increased accuracy of observation planning.

The written description describes the subject matter herein to enable any person skilled in the art to make and use the embodiments of the present disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor implemented method (200) comprising:
    encoding a static knowledge graph pertaining to (i) an infrastructure being monitored, (ii) ambience and (iii) a data acquisition system configured to monitor the infrastructure in the form of a Qualitative Believe Network (QBN) (202); and
    iteratively performing inferencing of the QBN (204) by:
        dynamically capturing observed state of one or more nodes constituting the QBN and propagating belief on an instance of the static knowledge graph (204a);
        identifying list of nodes with unobserved evidences in the QBN (204b);
        computing Quality of Observation (QoO) for each of the nodes in the list (204c);
        selecting the node having a highest value of QoO (204d);
        obtaining vision based observation of the node having the highest value of QoO (204e); and
        assigning the vision based observation as current observed state to the node having the highest value of QoO (204f);
    until a stopping criterion is reached.

2. The processor implemented method of claim 1, further comprising identifying a plausible fault node based on the inferencing of the QBN (206).

3. The processor implemented method of claim 1, wherein the step of dynamically capturing observed state of one or more nodes constituting the QBN and propagating belief comprises resolving node ambiguities within sub-graphs of qualitative belief networks.

4. The processor implemented method of claim 3, wherein resolving node ambiguities comprises assigning either a positive belief (+) state or a negative belief (−) state to one or more cause nodes having an ambiguous state (?) by:
    allowing an indirectly propagated influence to dominate a prior state of a cause node and behave as a direct influence, if the identified errant sub-graph leads to ambiguous inferences during indirect influence on the cause node; and
    blocking propagation of intercausal influence between two cause nodes, if an identified errant cyclic sub-graph leads to ambiguous inferences during mutual propagation of opposing influences therebetween.

5. The processor implemented method of claim 3, wherein the stopping criterion is one of:
    (i) a plausible fault node with an unambiguous belief of '+' or '−' is identified;
    (ii) all cause nodes do not update associated belief signs in a next iteration; or
    (iii) some of the cause nodes start getting associated with an ambiguous '?' belief state that does not get resolved.

6. The processor implemented method of claim 1, wherein the Quality of Observation (QoO) is based on parameters including:
    (i) reach (r) of an observation being number of inference nodes likely to change state as a result of the observation;
    (ii) accuracy (a) of an observation being the accuracy of computer vision algorithms generating the observation;
    (iii) cost (c) of an observation being cost of sensors capturing the observation and cost of operating the data acquisition system; and
    (iv) boolean significance (S) of a node given the sign of prior observations ($O_{prior}$).

7. A system (100) comprising:
    one or more data storage devices (102) operatively coupled to one or more hardware processors (104) and configured to store instructions configured for execution by the one or more hardware processors to:
    encode a static knowledge graph pertaining to (i) an infrastructure being monitored, (ii) ambience and (iii) a data acquisition system configured to monitor the infrastructure in the form of a Qualitative Believe Network (QBN); and
    iteratively perform inferencing of the QBN by:
        dynamically capturing observed state of one or more nodes constituting the QBN and propagating belief on an instance of the static knowledge graph;

identifying list of nodes with unobserved evidences in the QBN;
computing Quality of Observation (QoO) for each of the nodes in the list;
selecting the node having a highest value of QoO;
obtaining vision based observation of the node having the highest value of QoO; and
assigning the vision based observation as current observed state to the node having the highest value of QoO;
until a stopping criterion is reached.

8. The system of claim 7, wherein the one or more hardware processors are further configured to identify a plausible fault node based on the inferencing of the QBN.

9. The system of claim 7, wherein the one or more hardware processors are further configured to resolve node ambiguities within sub-graphs of qualitative belief networks when capturing observed state of one or more nodes constituting the QBN and propagating belief.

10. The system of claim 9, wherein the one or more hardware processors are further configured to resolve node ambiguities by assigning either a positive belief (+) state or a negative belief (−) state to one or more cause nodes having an ambiguous state (?) by:
allowing an indirectly propagated influence to dominate a prior state of a cause node and behave as a direct influence, if the identified errant sub-graph leads to ambiguous inferences during indirect influence on the cause node; and
blocking propagation of intercausal influence between two cause nodes, if an identified errant cyclic sub-graph leads to ambiguous inferences during mutual propagation of opposing influences therebetween.

11. The system of claim 9, wherein the stopping criterion is one of:
(i) a plausible fault node with an unambiguous belief of '+' or '−' is identified;
(ii) all cause nodes do not update associated belief signs in a next iteration; or
(iii) some of the cause nodes start getting associated with an ambiguous '?' belief state that does not get resolved.

12. The system of claim 7, wherein the Quality of Observation (QoO) is based on parameters including:
(i) reach (r) of an observation being number of inference nodes likely to change state as a result of the observation;
(ii) accuracy (a) of an observation being the accuracy of computer vision algorithms generating the observation;
(iii) cost (c) of an observation being cost of sensors capturing the observation and cost of operating the data acquisition system; and
(iv) boolean significance (S) of a node given the sign of prior observations ($O_{prior}$).

13. A computer program product comprising a non-transitory computer readable medium having a computer readable program embodied therein, wherein the computer readable program, when executed on a computing device, causes the computing device to:
encode a static knowledge graph pertaining to (i) an infrastructure being monitored, (ii) ambience and (iii) a data acquisition system configured to monitor the infrastructure in the form of a Qualitative Believe Network (QBN); and
iteratively perform inferencing of the QBN by:
dynamically capture observed state of one or more nodes constituting the QBN and propagating belief on an instance of the static knowledge graph;
identifying list of nodes with unobserved evidences in the QBN;
computing Quality of Observation (QoO) for each of the nodes in the list;
selecting the node having a highest value of QoO;
obtaining vision based observation of the node having the highest value of QoO; and
assigning the vision based observation as current observed state to the node having the highest value of QoO;
until a stopping criterion is reached.

14. The computer program product of claim 13, wherein the computer readable program further causes the computing device to identify a plausible fault node based on the inferencing of the QBN.

15. The computer program product of claim 13, wherein the computer readable program further causes the computing device to dynamically capture observed state of one or more nodes constituting the QBN and propagating belief by resolving node ambiguities within sub-graphs of qualitative belief networks.

16. The computer program product of claim 15, wherein resolving node ambiguities comprises assigning either a positive belief (+) state or a negative belief (−) state to one or more cause nodes having an ambiguous state (?) by:
allowing an indirectly propagated influence to dominate a prior state of a cause node and behave as a direct influence, if the identified errant sub-graph leads to ambiguous inferences during indirect influence on the cause node; and
blocking propagation of intercausal influence between two cause nodes, if an identified errant cyclic sub-graph leads to ambiguous inferences during mutual propagation of opposing influences therebetween.

* * * * *